United States Patent [19]
Bergstedt

[11] Patent Number: 6,094,302
[45] Date of Patent: Jul. 25, 2000

[54] SIGHT COMPRISING IR CAMERA AND HAVING A LARGE OBSERVATION AREA

[75] Inventor: Dan Bergstedt, Lidingö, Sweden

[73] Assignee: Celsiustech Electronics AB, Jarfalla, Sweden

[21] Appl. No.: 09/125,943

[22] PCT Filed: Mar. 20, 1997

[86] PCT No.: PCT/SE97/00459

§ 371 Date: Nov. 6, 1998

§ 102(e) Date: Nov. 6, 1998

[87] PCT Pub. No.: WO97/36202

PCT Pub. Date: Oct. 2, 1997

[30]        Foreign Application Priority Data

Mar. 22, 1996 [SE] Sweden .................................. 9601097

[51] Int. Cl.⁷ ............................... G02B 23/08; G02B 5/30
[52] U.S. Cl. .......................... 359/403; 359/350; 359/353; 359/431
[58] Field of Search ...................... 359/350–366, 359/400–406, 429–430, 850–863, 618, 627, 629–633, 725–732, 831–837, 214 VT; 250/330, 334

[56]        References Cited

U.S. PATENT DOCUMENTS

| | | | |
|---|---|---|---|
| 1,006,230 | 10/1911 | Kollmorgen | 359/401 |
| 3,632,868 | 1/1972 | Gaffard | 359/350 |
| 4,158,504 | 6/1979 | De Ponteves et al. | 359/353 |
| 4,483,587 | 11/1984 | Michon et la. | 250/330 |
| 5,035,472 | 7/1991 | Hansen | 359/350 |
| 5,084,780 | 1/1992 | Phillips | 359/350 |
| 5,149,969 | 9/1992 | Fouilloy et al. | 359/401 |
| 5,469,236 | 11/1995 | Roessel | 359/402 |

FOREIGN PATENT DOCUMENTS

| | | |
|---|---|---|
| 0 179 186 | 4/1986 | European Pat. Off. . |
| 32 32 092 C1 | 3/1984 | Germany . |
| 2 166 884 | 5/1986 | United Kingdom . |

*Primary Examiner*—Thong Nguyen
*Attorney, Agent, or Firm*—Pollock, Vande Sande & Amernick

[57]        ABSTRACT

A sight including an infrared camera. A first admission aperture receives an incident image. The position of the first admission aperture is rotatable vertically and sideways. A mirror arrangement is rotatable about a common axis for derotation of the incident image. An output aperture is fixed with respect to the infrared camera. The incident image passes through the output aperture to the infrared camera.

20 Claims, 2 Drawing Sheets

SIGHT COMPRISING IR CAMERA AND HAVING A LARGE OBSERVATION AREA

FIELD OF THE INVENTION

The present invention relates to a sight comprising an infrared (IR) camera and device for obtaining a large observation area.

BACKGROUND OF THE INVENTION

In order to increase the observation area for an infrared (IR) camera, it is already known to angle those components of the infrared (IR) camera which contain the IR detector. These are bulky components which have to be moved and thus, known designs are cumbersome and can be used within relatively restricted observation areas.

SUMMARY OF THE INVENTION

The object of the present invention is to provide a compact construction of a sight with an IR camera which at the same time permits use of a large observation area, for example of hemispherical shape.

The object of the invention is achieved by means of a sight in which the device for obtaining a large observation area comprises an admission aperture which can be rotated vertically and sideways for receiving an incident image, a mirror arrangement rotatable about a common axis for derotation of the image incident through the admission aperture, and an output aperture which is related in fixed terms to the IR detector of the IR camera. The invention uses an IR camera with fixed mounting of the IR detector, in combination with an admission aperture which can be rotated vertically and sideways. A mirror arrangement ensures that the image is rotated so that an observer always sees the image the right way round.

It should be said here that arrangements for turning the image the right way round for an observer are already known. A prism arrangement can be used in this connection for turning the image. However, this entails completely different wavelength ranges from those which apply in the case of IR cameras.

According to one advantageous embodiment of the invention, the mirror arrangement consists of three plane mirrors arranged to reflect an image incident on the mirror arrangement parallel to the axis of derotation, so that the image leaves the mirror arrangement in a continuation of the direction of incidence. The first mirror and the third mirror are advantageously inclined relative to the axis of derotation and are arranged to meet at a common edge in front of which the second mirror is arranged.

According to another advantageous embodiment of the invention, the arrangement for obtaining a large observation area comprises a first structure which can be rotated about a first axis, the structure comprising an admission aperture which consists of an objective with one or more lenses and a mirror inclined in relation to the admission aperture. A second structure rotatable about a second axis at right angles to the first axis and comprises an inclined mirror for directing the incident image towards the mirror arrangement. A third structure supporting the mirror arrangement and rotatable about the same second axis. The arragement also includes a fourth structure which is fixed relative to the IR camera. By means of this arrangement with four structures, scanning of the desired area can be carried out in a simple and functionally reliable manner.

The sight can advantageously comprise a channel for IR light and a channel for visible light. According to one advantageous embodiment, a prism arrangement, in combination with a mirror transparent to visible light, is arranged to combine the IR light and the visible light into a common channel. To divide the light once again into IR light and visible light, a mirror which is transparent to IR light can be used.

For receiving the visible light, the arrangement for obtaining a large observation area can advantageously comprise a fifth structure rotatable about the first axis. The fifth structure comprises an admission aperture which consists of an objective with one or more lenses and a mirror which is inclined in relation to the admission aperture.

BRIEF DESCRIPTION OF THE DRAWINGS

The invention will be described in greater detail hereinbelow on the basis of illustrative embodiments and with reference to the attached drawings, in which.

DETAILED DESCRIPTION OF THE DRAWINGS

Figure 1:
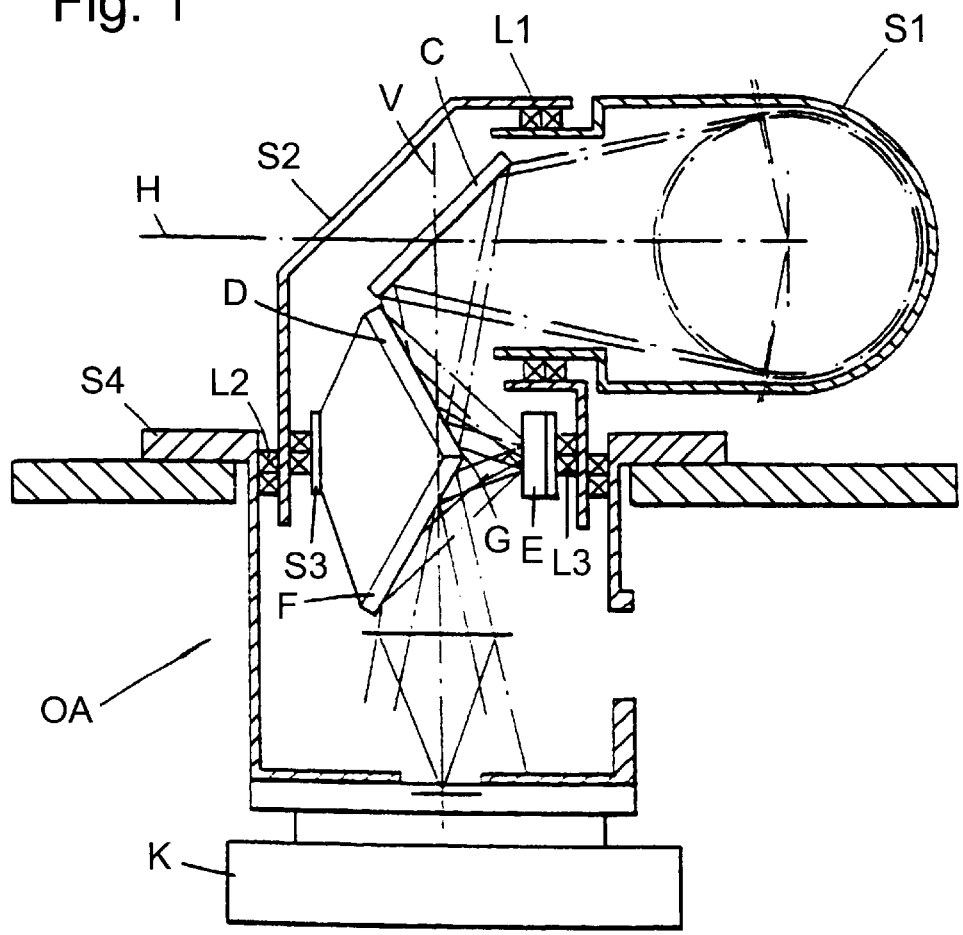
FIG. 1 shows a partial cross-sectional side view of a first example of a sight with an IR camera according to the invention.
Figure 2:
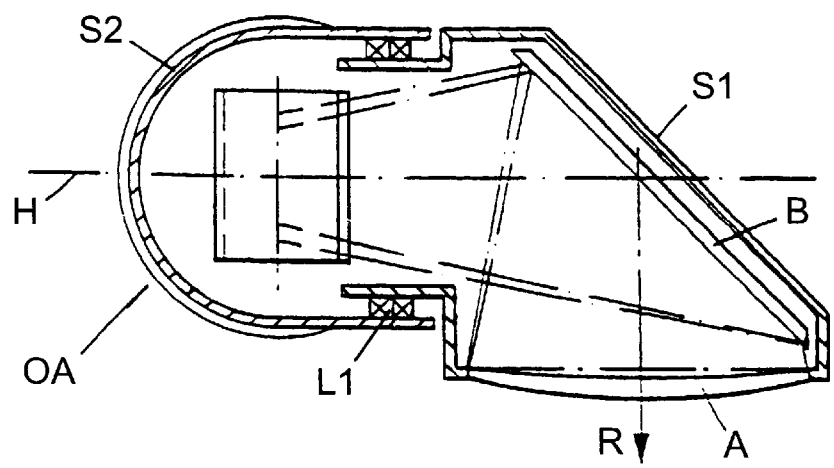
FIG. 2 shows a partial cross-sectional top view of the sight according to FIG. 1.

The sight shown in FIGS. 1 and 2 comprises an infrared (IR) camera part K with an infrared (IR) detector and a device OA for increasing the observation area.

The device OA comprises a first structure S1 which can be rotated about an axis H. The structure S1 is mounted in a second structure S2 by means of a bearing L1. The structure S1 supports an objective A which in the figure is represented by a single lens, but which in accordance with known principles can consist of a plurality of lenses. Inside the structure S1 there is a mirror B which is arranged at an angle of 45 degrees with respect to the viewing direction R.

The structure S2 can be rotated about a second axis V essentially at right angles to the first axis H with the cooperation of a second bearing L2 mounted between the second structure S2 and a fourth structure S4 which is fixed in relation to the IR detector of the camera part. An angled mirror C is mounted in the structure S2. The mirror reflects an image incident in the longitudinal direction of the axis H through 90° in a direction corresponding to the longitudinal direction of the axis V.

In the beam path of the image reflected by the mirror C there is a mirror arrangement consisting of three plane mirrors D, E and F. The mirror arrangement is fixed in a third structure S3. In the embodiment shown, the structure S3 is mounted, by means of a bearing L3, in the structure S2 so that it can rotate about the axis V. Alternatively, the structure S3 can be mounted so as to rotate in the structure S4. The three mirrors are thus arranged in relation to each other so that a beam incident on the first mirror, after reflection in the mirrors, leaves the mirror arrangement in a continuation of the direction of the incident beam. In order to produce this beam path, the first mirror D and the third mirror F are arranged inclined in the beam path with a common edge G in front of the second mirror E. The rotation of the structures S1, S2 and S3 can be obtained by means of drive motors of a suitable known design. The drive motors do not constitute a part of the invention and therefore have not been shown.

By rotating the structure S1 about the axis H and the structure S2 about the axis V, any arbitrary viewing direction can be selected within a large observation area. Rotating the structure S3 ensures that the image is turned so that an observer sees the image the right way round.

Figure 3:
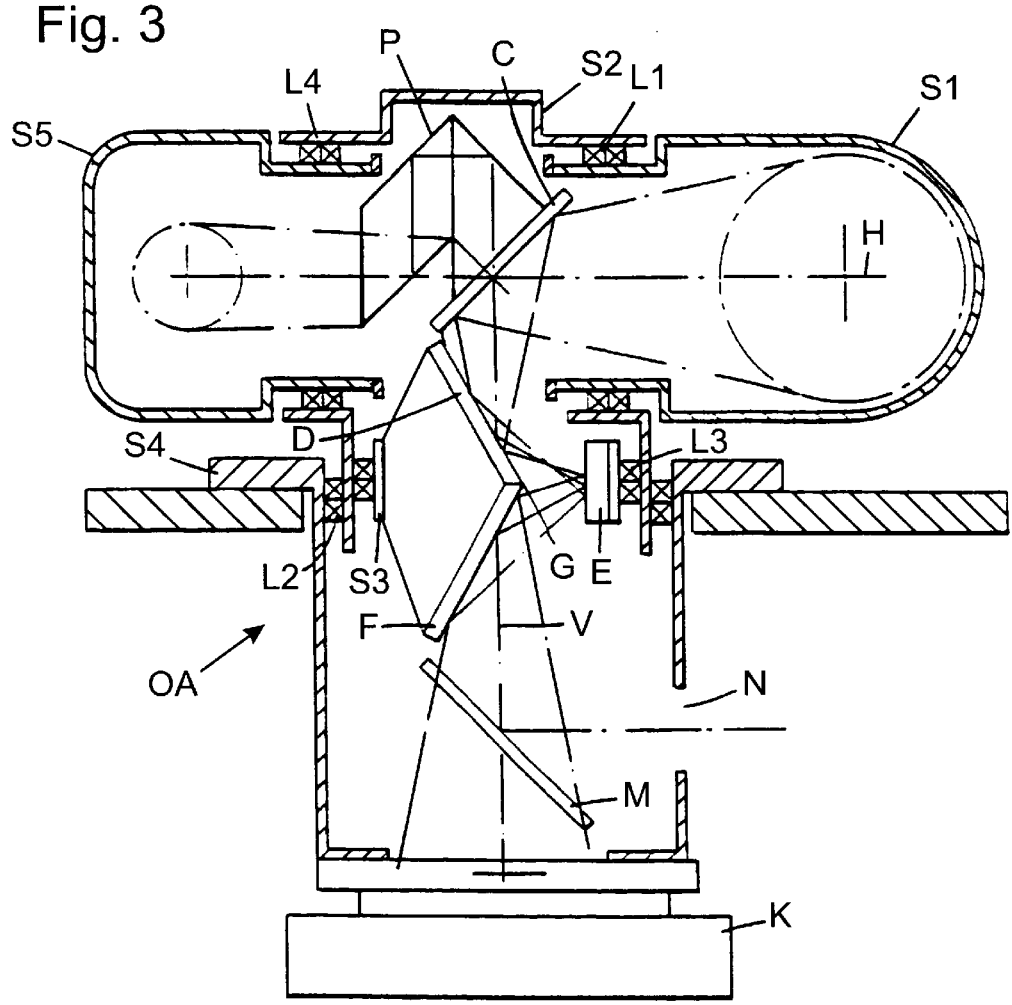
FIG. 3 shows a partial cross-sectional top view of a second example of a sight with an IR camera according to the invention.
Figure 4:
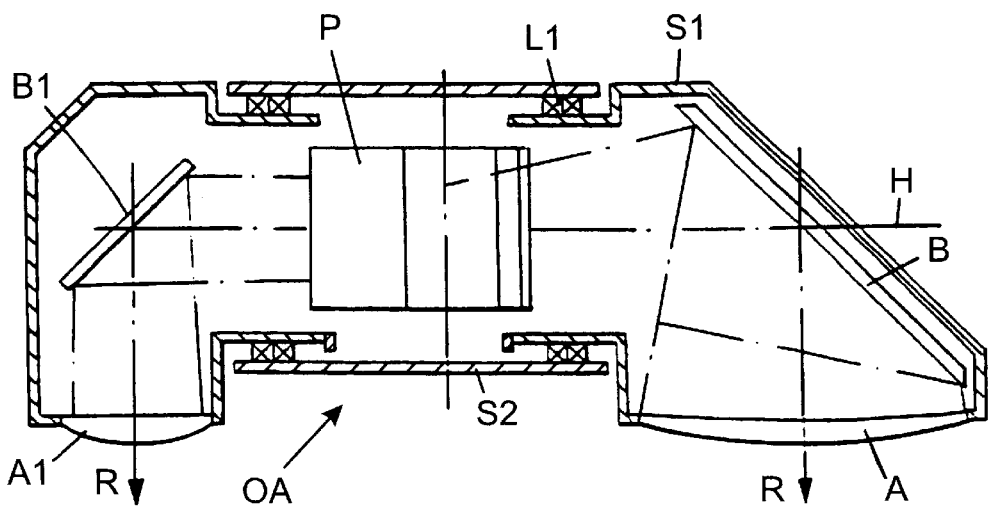
FIG. 4 shows a partial cross-sectional top view of the sight according to FIG. 3.

The sight shown in FIGS. 3 and 4 comprises, in addition to a channel for IR light, a further channel for visible light. The components which correspond to those described in the embodiment with reference to FIGS. 1 and 2 have been given the same reference labels and in principle function in the same way.

In order to receive visible light, there is provided a fifth structure S5. Like the structure S1, the structure S5 can be rotated about the axis H and is mounted in the second structure S2. The mounting is achieved by means of a fourth bearing L4. Like the structure S1, the structure S5 is provided with an objective designated A1 and a mirror designated B1 arranged at a 45 degree angle to the viewing direction R. During simultaneous use of the channels for visible light and IR light, the movement of the first structure S1 and of the fifth structure S5 is coordinated so that during the movement they monitor in parallel the same viewing direction. The structures Si and S5 can advantageously be arranged to be driven independently of each other, which can be advantageous when only one channel is used.

An image incident on the structure S5 is reflected, after it has passed through the objective A1, towards a prism arrangement P by the mirror B1. The prism arrangement P combines the channel for visible light with the IR channel via the mirror C which is transparent to visible light. After passing the derotation arrangement D, E, F, the channels are once again separated by means of a mirror M which transmits IR light and reflects visible light. The reflected visible light reaches an observer via an aperture N.

What is claimed is:

1. A sight, comprising:
    an infrared camera;
    a first admission aperture for receiving an incident image, a position of the first admission aperture being rotatable vertically and sideways;
    a mirror arrangement rotatable about a common axis for derotation of the incident image; and
    an output aperture fixed with respect to the infrared camera, the incident image passing through the output aperture to the infrared camera.

2. The sight according to claim 1, wherein the mirror arrangement comprises three plane mirrors arranged to reflect an image incident among the three mirrors, the image being incident on a first mirror of the mirror arrangement parallel to the common axis for derotation and the image being reflected from a third mirror of the mirror arrangement in a direction of incidence of the incident image.

3. The sight according to claim 2, wherein the first mirror and the third mirror are inclined relative to the common axis of derotation and meet at a common edge in front of which a second of the mirror arrangement is arranged, the image being reflected from the first mirror to the second mirror and from the second mirror to the third mirror.

4. The sight according to claim 1, further comprising:
    at least one objective lens arranged in the first admission aperture.

5. The sight according to claim 1, further comprising:
    a channel for receiving visible light.

6. The sight according to claim 5, further comprising:
    a prism; and
    a mirror transparent to visible light;
    wherein the prism and the mirror transparent to visible light are arranged in the channel for receiving visible light, and wherein the prism directs the visible light and the mirror transparent to visible light directs infrared light such that the visible light and the infrared light are combined on a common path.

7. The sight according to claim 6, further comprising:
    a mirror transparent to infrared light and arranged such that after derotation of the combined visible light and infrared light the mirror transparent to infrared light divides the visible light and the infrared light.

8. The sight according to claim 5, further comprising:
    a second admission aperture for receiving the visible light.

9. The sight according to claim 5, further comprising:
    at least one objective lens arranged in the second admission aperture.

10. The sight according to claim 5, wherein the second admission aperture is rotatable vertically and sideways.

11. The sight according to claim 5, further comprising:
    a visible light reflecting mirror inclined with respect to the second admission aperture.

12. A sight, comprising:
    an infrared camera;
    a first structure rotatable about a first axis and comprising a first admission aperture for receiving an incident image, the first structure also comprising a first structure mirror inclined with respect to the first admission aperture;
    a second structure rotatable about a second axis perpendicular to the first axis and comprising a second structure mirror inclined with respect to the second axis;
    a mirror arrangement rotatable about a common axis for receiving an image reflected by the second structure mirror and for derotation of the incident image;
    a third structure for supporting the mirror arrangement and being rotatable about the second axis; and
    a fourth structure fixed with respect to the infrared camera and including an output aperture.

13. The sight according to claim 12, further comprising:
    at least one objective lens arranged in the first admission aperture.

14. The sight according to claim 12, further comprising:
    a fifth structure rotatable about the first axis and comprising a second admission aperture for receiving visible light.

15. The sight according to claim 14, wherein the fifth structure further comprises a prism and wherein the first structure mirror is transparent to visible light, and wherein the prism directs the visible light and the first structure mirror directs infrared light such that the visible light and the infrared light are combined on a common path.

16. The sight according to claim 15, further comprising:
    a mirror transparent to infrared light and arranged in the fourth structure such that after derotation of the combined visible light and infrared light the mirror transparent to infrared light divides the visible light and the infrared light.

17. The sight according to claim 14, further comprising:
    at least one objective lens arranged in the second admission aperture.

18. The sight according to claim 14, wherein the second admission aperture is rotatable vertically and sideways.

19. The sight according to claim 12, wherein the mirror arrangement comprises three plane mirrors arranged to reflect an image among the three mirrors, the image being incident on a first mirror of the mirror arrangement parallel to the common axis for derotation and the image being reflected by a third mirror of the mirror arrangement in a direction of incidence of the incident image.

20. The sight according to claim 19, wherein the first mirror and the third mirror are inclined relative to the common axis of derotation and meet at a common edge in front of which a second of the mirror arrangement is arranged, the image being reflected from the first mirror to the second mirror and from the second mirror to the third mirror.

* * * * *